(12) United States Patent
Taguchi et al.

(10) Patent No.: US 8,493,432 B2
(45) Date of Patent: Jul. 23, 2013

(54) DIGITAL REFOCUSING FOR WIDE-ANGLE IMAGES USING AXIAL-CONE CAMERAS

(75) Inventors: Yuichi Taguchi, Cambridge, MA (US); Amit K. Agrawal, Somerville, MA (US); Ashok N. Veeraraghavan, Cambridge, MA (US); Srikumar Ramalingam, Cambridge, MA (US); Ramesh Raskar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 511 days.

(21) Appl. No.: 12/825,608

(22) Filed: Jun. 29, 2010

(65) Prior Publication Data

US 2011/0316968 A1 Dec. 29, 2011

(51) Int. Cl.
*H04N 7/00* (2011.01)
(52) U.S. Cl.
USPC .......................................... 348/36
(58) Field of Classification Search
USPC ............................ 348/36; 382/255
See application file for complete search history.

(56) References Cited

U.S. PATENT DOCUMENTS

| | | | |
|---|---|---|---|
| 2006/0023105 A1* | 2/2006 | Kostrzewski et al. | 348/335 |
| 2006/0232584 A1* | 10/2006 | Utsugi et al. | 345/426 |
| 2007/0182812 A1* | 8/2007 | Ritchey | 348/36 |
| 2008/0131019 A1* | 6/2008 | Ng | 382/255 |
| 2008/0309754 A1* | 12/2008 | Nayar | 348/46 |
| 2010/0020187 A1* | 1/2010 | Georgiev | 348/218.1 |

* cited by examiner

*Primary Examiner* — Mehrdad Dastouri
*Assistant Examiner* — Jared Walker
(74) *Attorney, Agent, or Firm* — Gene Vinokur; Dirk Brinkman

(57) ABSTRACT

A single camera acquires an input image of a scene as observed in an array of spheres, wherein pixels in the input image corresponding to each sphere form a sphere image. A set of virtual cameras are defined for each sphere on a line joining a center of the sphere and a center of projection of the camera, wherein each virtual camera has a different virtual viewpoint and an associated cone of rays, appearing as a circle of pixels on its virtual image plane. A projective texture mapping of each sphere image is applied to all of the virtual cameras on the virtual image plane to produce a virtual camera image comprising circle of pixels. Each virtual camera image for each sphere is then projected to a refocusing geometry using a refocus viewpoint to produce a wide-angle light-field view, which are averaged to produce a refocused wide-angle image.

24 Claims, 9 Drawing Sheets

DIGITAL REFOCUSING FOR WIDE-ANGLE IMAGES USING AXIAL-CONE CAMERAS

FIELD OF THE INVENTION

This invention relates generally to wide-angle imaging, and more particularly digital refocusing for wide-angle images.

BACKGROUND OF THE INVENTION

Wide angle imaging offers a different way to visualize the world. However, typical wide-angle images exhibit large depth of field (DOF). It is desired to provide depth of field effects for wide-angle images.

A conventional method acquires a wide field-of-view (FOV) lightfield using multiple sequential images by a moving camera with a narrow-angle lens or a wide-angle (fisheye) lens. A translation stage or pan-tilt units can also be used. Wide angle panoramas and mosaics also require multiple images acquired by either rotating the camera around its optical axis, or along a path. These approaches require the scene to be static, and increase the acquisition time. A camera array with wide-angle lenses can avoid these problems. However, this is more expensive and less portable. Moreover, the multiple cameras need to be synchronized, and calibrated radiometrically and geometrically with respect to each other.

Lightfield Cameras

The concept of lightfield as a representation of all rays of light in free-space is well known. Lightfields acquired using camera arrays have been used for synthetic aperture imaging and digital refocusing.

Hand-held lightfield cameras trade spatial resolution for angular resolution. Those cameras either insert a micro-lens array or mask close to the sensor, or use an array of lens and prisms in front of the main lens. Those types of cameras offer only a limited FOV, which is determined by the main lens.

Different parameterizations such as 2-sphere and sphere-plane have been described for sampling lightfields over a sphere.

Catadioptric Imaging Systems

Catadioptric imaging systems (CIS), which include mirrors (cata) and lenses (dioptric), offer an alternative approach to increase the FOV in a single image. An omnidirectional sensor having a 360°×50° FOV uses four planar mirrors in a pyramidal configuration with four cameras.

An array of planar mirrors can be used to acquire a lightfield. A spherical mirror with a perspective camera leads to a non-single viewpoint or multi-perspective image when the camera is placed outside the sphere. Radial CIS, which use a camera looking through a single hollow rotationally symmetric mirror polished on the inside, can perform 3D reconstruction, generation of texture maps, and computation of the BRDF parameters. A single mirror results in a circular locus of virtual viewpoints.

Spherical mirror arrays have been used for acquiring incident lightfield for relighting, and for 3D reconstruction. Each sphere image is re-mapped into latitude and longitude format, and ray-tracing is used to determine intersection with the lightfield plane. In each sphere image, vertices in a 3D mesh can be manually marked to generate a simple 3D model, which is difficult to extend to natural scenes. Acquired images of multiple spheres can be tesselated for 3D estimation.

Although spherical lenses are easier to produce, the lenses cause spherical aberrations, and decrease image quality. Aplanatic spherical lenses have been used for high power microscope objectives and endoscope objectives, and refractive sphere models have been used for modeling rain drops by tracing rays.

None of the prior art methods, which use spherical mirrors, have been used for refocusing of a wide-angle image acquired by a single stationary camera.

Projections of Wide-Angle Images

Perspective projection of a wide-angle image shows severe distortions at the periphery of the image. To map a sphere to a plane, several projections, which trade off different types of distortions have been developed. However, a global projection cannot keep all straight lines straight and preserve the shapes of the objects.

SUMMARY OF THE INVENTION

The embodiments of our invention provide artistic depth of field effects in wide-angle images, which typically exhibit large depth of field, along with dense wide-field-of-view (FOV) three-dimensional (3D) reconstruction. This requires acquiring rays from multiple viewpoints over a wide field-of-view. Designing a practical solution for wide-angle imaging presents challenges when considering factors such as single-shot acquisition, low cost, ease of camera placement, and fast and accurate post-processing.

We describe various designs using multiple spherical reflective and refractive elements, which enable refocusing in wide FOV using a single acquired image. We describe an accurate geometric modeling of the acquired multi-perspective image using axial-cone cameras, i.e., multiple virtual perspective cameras on a single axis, each with a different cone of rays. This modeling avoids explicit ray tracing and approximations. The modeling can be implemented in a graphic processing unit (GPU) for refocusing projective texture mapping.

Because a spherical shape results in virtual axial-cone cameras for any direction, we show that an array of reflective or refractive spheres meets the above challenges. We describe novel post-processing effects, such as digital refocusing, and depth dependent projection of wide-angle images acquired by a single camera.

DETAILED DESCRIPTION OF THE PREFERRED EMBODIMENTS

Method and System Overview

Figure 1:
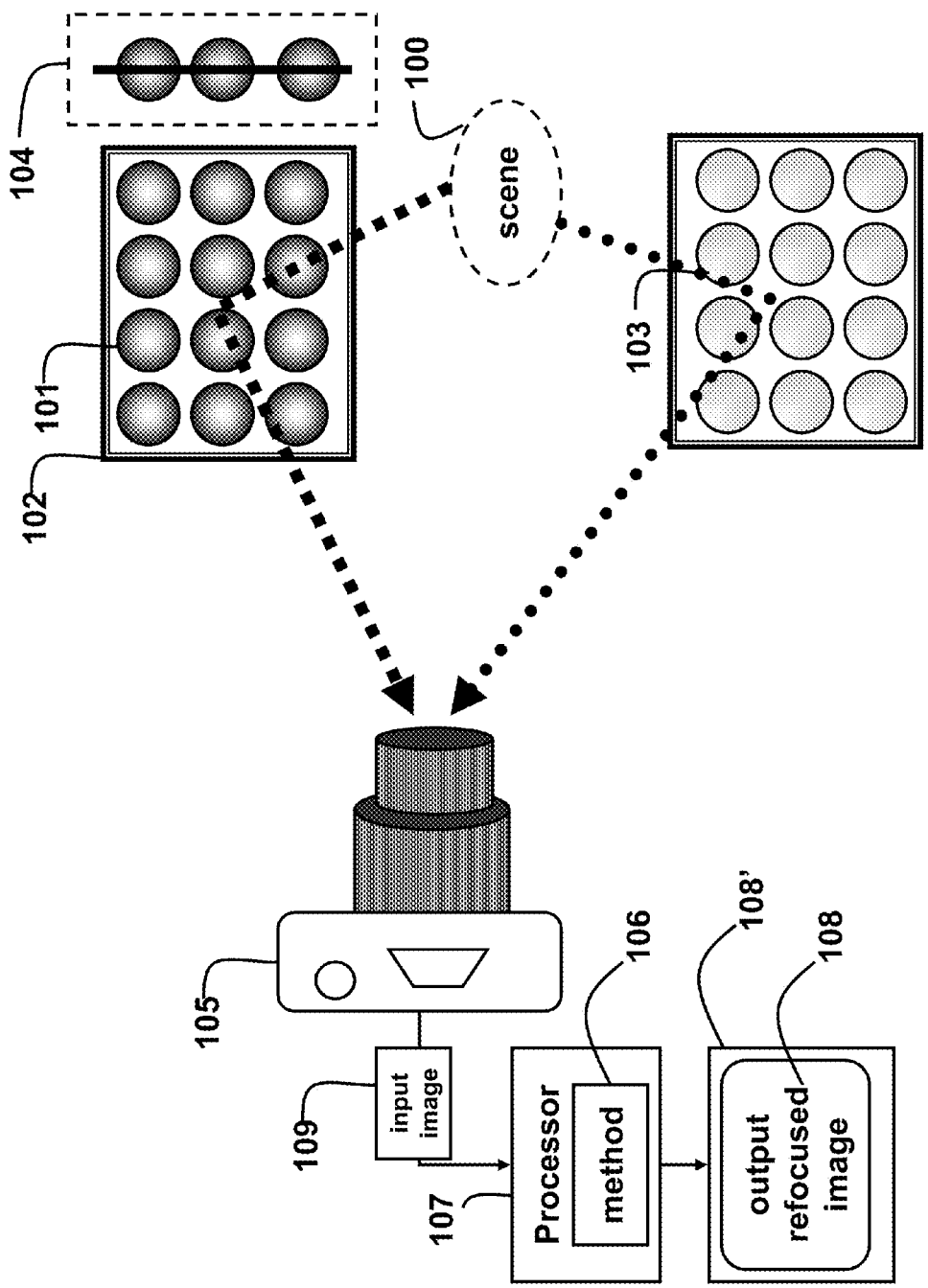
FIG. 1 is a block diagram of a method and system for refocusing for wide-angle image from an input image acquired by a single stationary camera according to embodiments of the invention.

As shown in FIG. 1, the embodiments of the invention provide a method and system for refocusing for an output image from a single image acquired by a conventional stationary camera with reflective or refractive elements. We can use an array of reflective spheres (e.g., mirror or steel balls) 101 arranged on a planar surface 102 for a reflective setup, or an array of refractive spheres (e.g., glass or acrylic balls) 103 for a refractive setup. By using spheres of different size, our design can be easily scaled to different scene scales. We use an array of spheres of 0.25" radii for small tabletop scenes, and 0.5" radii for room-size, or outdoor scenes. Inset 104 shows a side view of the array. The array can be regular, irregular, random, two- or three-dimensional.

Figure 2A:
FIG. 2A is a front view of an array of reflective spheres according to embodiments of the invention.
Figure 2B:
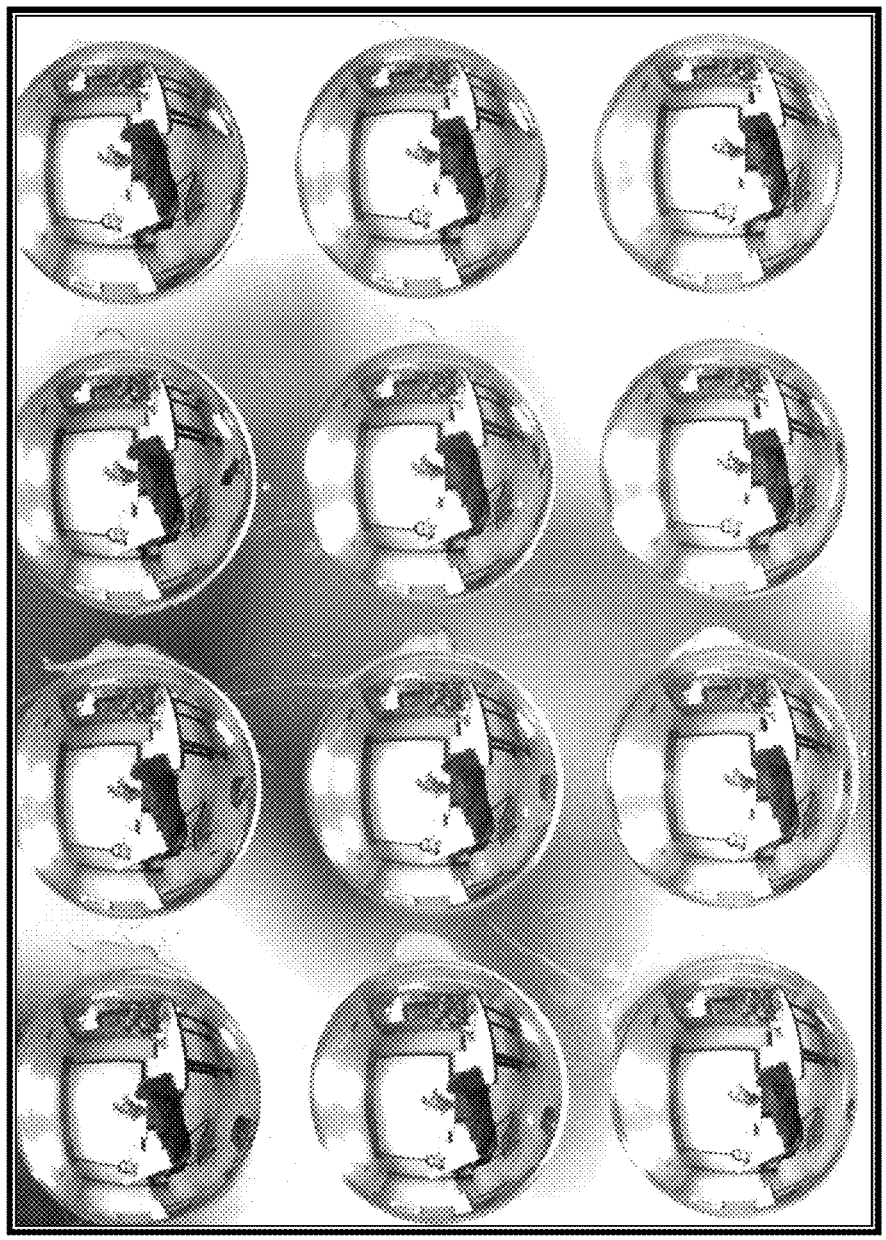
FIG. 2B is a front view of an array of refractive spheres according to embodiments of the invention.

A camera 105 acquires a single input image 109 of a scene 100 as observed in the reflective or refractive spheres. That is, the image shows the scene reflected in each reflective sphere as shown in FIG. 2A, or the scene acquired through each refractive sphere as shown in FIG. 2B. If the camera is a video camera, then multiple images can be acquired, and each image can be processed independently.

Figure 2C:
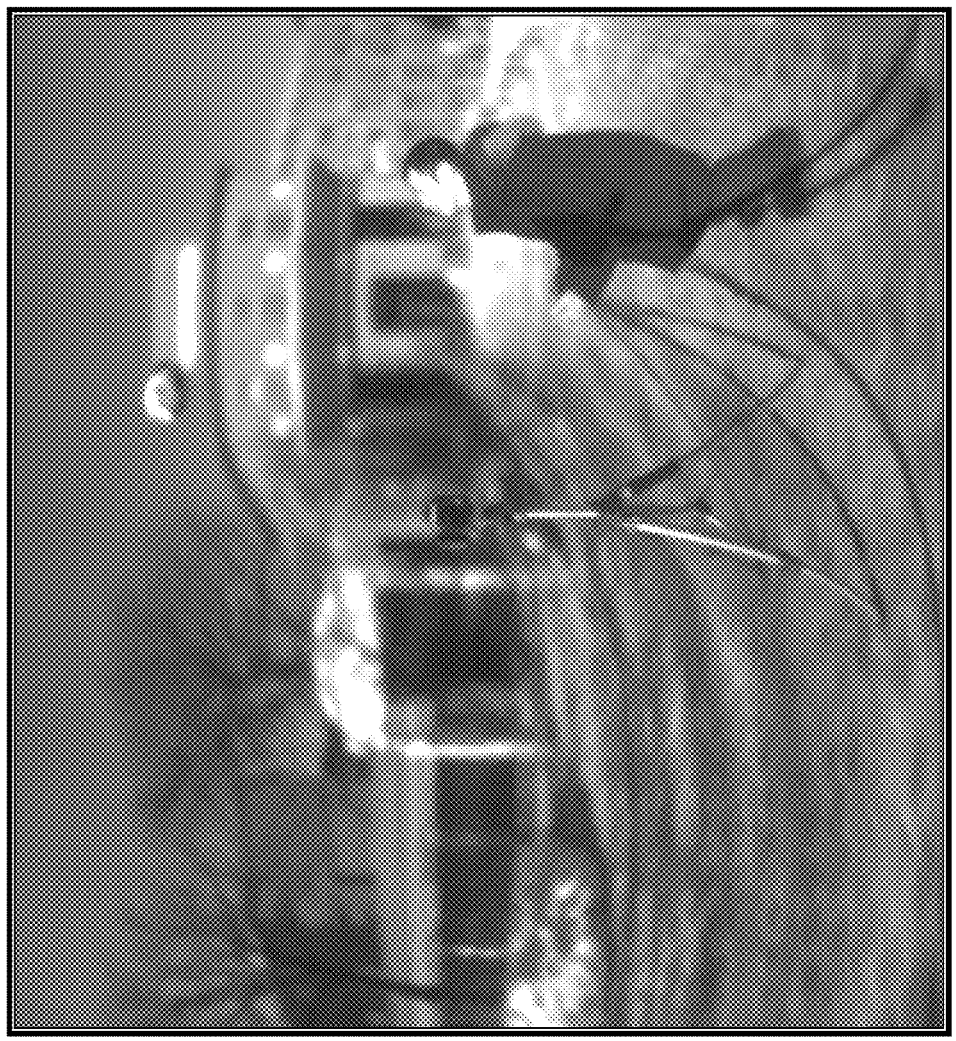
FIG. 2C is an image reconstructed from a wide-angle image of a scene reflected by the array of FIG. 2A according to embodiments of the invention.
Figure 2D:
FIG. 2D is an image reconstructed from a wide-angle image of a scene refracted by the array of FIG. 2B according to embodiments of the invention.

The image is processed by a method 106 executing in a processor 107. It is understood that processing millions of pixels cannot be performed mentally. It is also understood that the method transforms an input image to an output image. The method can perform various refocusing effects as described below. The result of the processing, a refocused output image 108, can be rendered on a display device 108'. FIGS. 2C and 2D respectively show reconstructed images acquired via the reflective and refractive spheres of FIGS. 2A-2B after refocusing according to the method 106.

For the two arrays, we respectively use a 12 MP Canon Rebel XSI camera with 300 mm lens, and a 22 MP Mamiya 645AFD camera having a pixel size of 9μ with a 210 mm lens, with f/8 aperture to avoid camera defocus. The camera is placed ≈850 mm from the arrays of spheres. It should be understood that other cameras can also be used.

Axial-Cone Modeling

If the camera 105 is placed on a rotational axis of a rotationally symmetric mirror, then the acquired rays can be modeled as axial-cone cameras, i.e., multiple perspective cameras arrange on the mirror axis each with a different cone of rays. As a result, we have a less restrictive setup compared to a central model and a more compact model than a non-central model.

Because lightfields are well-studied using perspective cameras, we can use available tools, such as a graphic processing unit (GPU) for fast rendering by employing such a model. This avoids the hard problem of determining the optical path from a 3D scene point to an image pixel (forward projection).

Possible rotationally symmetric mirrors include conic, parabolic and hyperbolic mirrors. If multiple mirrors are used, then it is difficult to place a single camera on the mirror axis of all the mirrors. Even when possible, e.g., hyperbolic or elliptical mirrors arranged to have the same foci, it would be restrictive and prone to misalignment. These disadvantages can be avoided if the mirror is rotationally symmetric in all directions, i.e., a sphere. Therefore, the choice of our spherical reflective and refractive spheres is motivated by our geometric modeling of catadioptric systems.

For rotationally symmetric mirrors, axial-cone modeling is not applicable unless the camera is on the mirror axis. A spherical mirror is an exception because the mirror axis can be defined to contain the camera and the center of the sphere.

Axial-Cone Camera Parameters

Figure 3A:
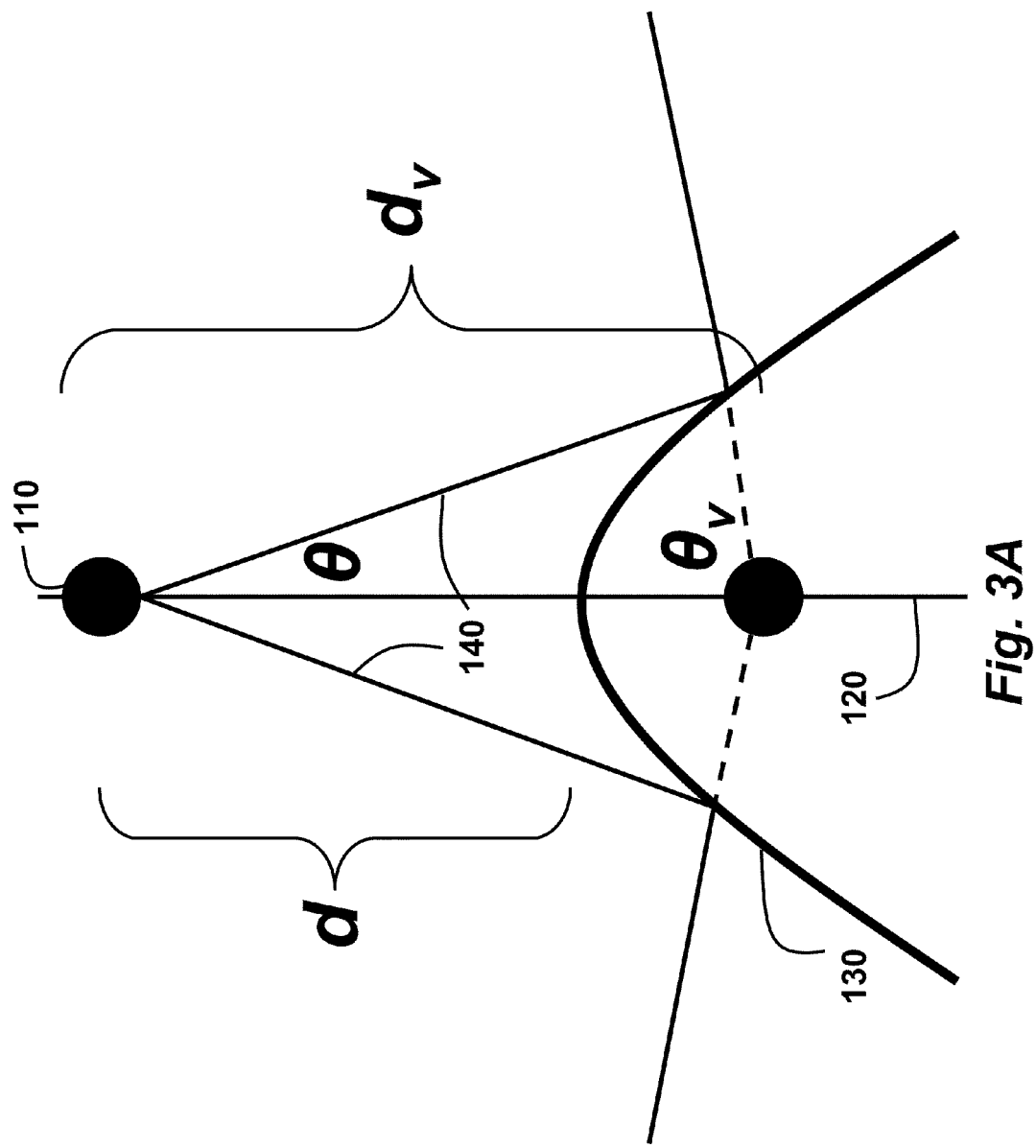
FIG. 3A is a schematic of a pinhole camera arranged on an axis of a rotationally symmetric mirror.

As shown in FIG. 3A, a (pinhole) camera 110 is arranged on an axis 120 of a rotationally symmetric mirror 130. We analyze a planar slice containing the axis. Consider two rays 140 at an angle θ from the vertical passing through the pinhole camera. Because the mirror is rotationally symmetric, after reflection, the rays intersect at a virtual viewpoint inside the mirror at a distance $d_v$ on the mirror axis, subtending an angle $θ_v$.

We analyze this effect in 3D. The key point to note is that the intersection of the above two rays are on the minor axis. For any out of plane rotation of the minor about its axis, $d_v$ remains fixed in 3D for the angle θ, because $d_v$ is on the axis itself. Thus, the locus of virtual viewpoints for the angle θ is a single 3D point on the minor axis.

Hence, a cone of rays corresponding to the angle θ in the acquired image can be mapped to a cone of rays corresponding to the angle $θ_v$ for a virtual perspective camera placed at the distance $d_v$. For simplicity, we refer to rays on the surface of a cone as a cone of rays. In the acquired image, each cone of rays corresponds to a circle of pixels when the optical axis is aligned with the minor axis.

Thus, each circle of pixels in the acquired image with radius corresponding to the angle θ can be mapped to a circle of pixels in the virtual perspective camera placed at a distance $d_v$ with radius corresponding to the angle $θ_v$. If the optical axis of the camera is not aligned with the minor axis, then the resulting image is related by a homography, which can be applied as a pre-processing step.

A CIS including a rotationally symmetric minor and a perspective camera has an effective single viewpoint if $d_v$ is same for all angles θ. This occurs only if a hyperboloid or ellipsoidal minor is used with a perspective camera placed on one of the two foci of the minor. The other focus of the minor corresponds to the virtual viewpoint.

For other configurations, there is no effective single viewpoint because the distance $d_v$ depends on the angle θ. Nevertheless, all virtual viewpoints can be defined on the minor axis. We therefore refer to the set of virtual viewpoints as axial-cone cameras. Note that each virtual viewpoint has only a cone of rays, i.e., a circle of pixels and not a square 2D image.

The Off-Axis Case

Figure 3B:
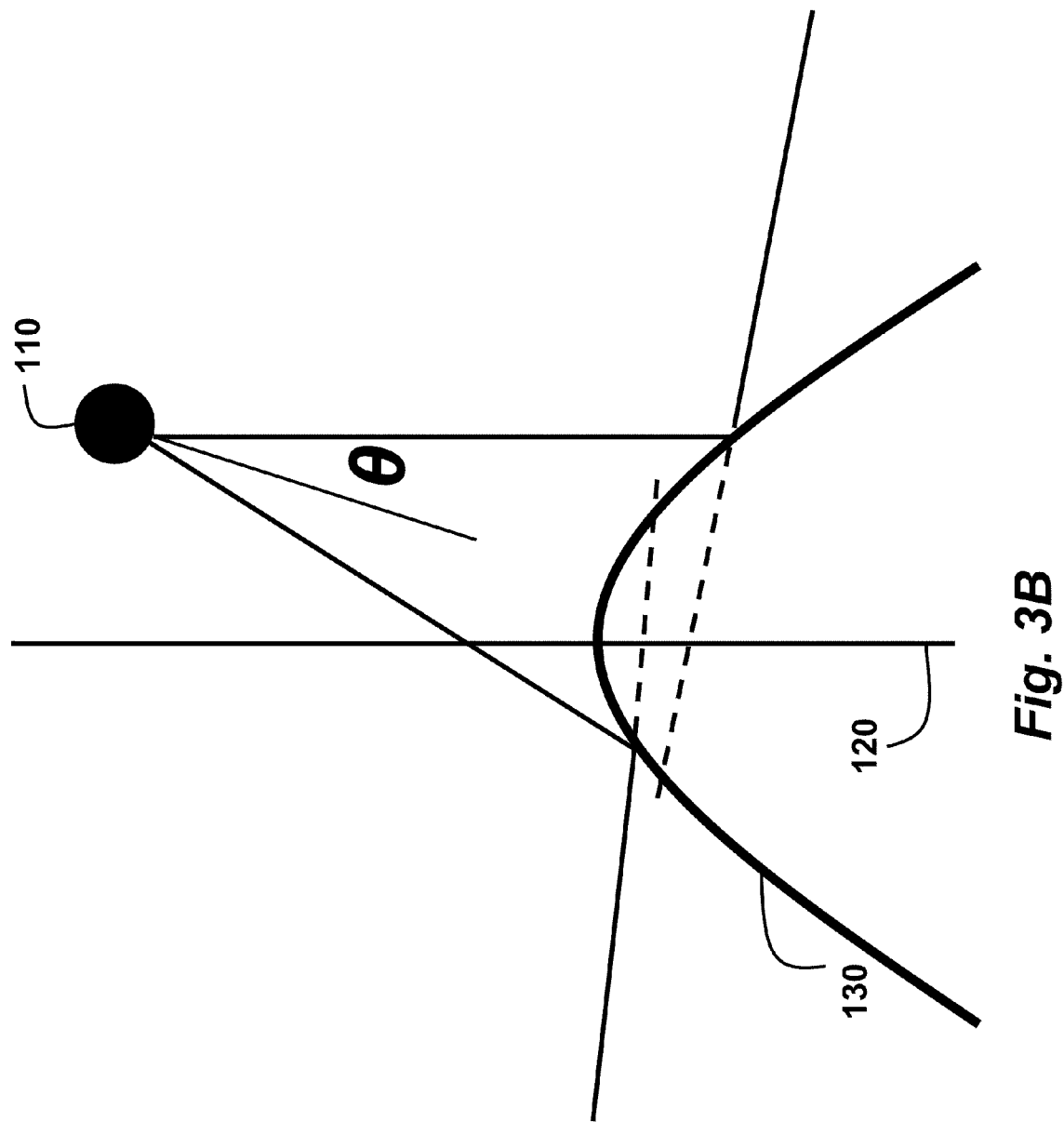
FIG. 3B is a schematic of a pinhole camera arranged on off-axis of a rotationally symmetric mirror.

FIG. 3B shows the off-axis case. Two rays subtending an angle θ from the camera's optical axis, after reflection from the minor, do not intersect on the minor axis. Thus, in 3D, the locus of viewpoints for the angle θ is not a single point as in the on-axis case. A practical consequence is that for each pixel in the acquired image, we need to define a new virtual perspective camera.

Spherical Mirror

A spherical mirror represents a special case in the above analysis. Because the sphere is symmetric in all directions, the line joining the center of the sphere to the camera can always be an axis of symmetry. Thus, virtual cameras can be defined along this axis. Thus, for a spherical mirror, ray modeling is not affected by the relative camera-mirror pose.

The center of projection (COP) of a camera is placed at an origin of an arbitrary coordinate system, and a spherical mirror of radius r is placed at a distance d from the COP. The distance of the virtual camera for the ray subtending the angle of θ is $d_v$. Then, $$\tan\theta = \frac{r\cos\beta}{d - r\sin\beta}, \text{ and}$$

$$\sin\beta = \frac{d\sin^2\theta \pm \cos\theta\sqrt{r^2 - d^2\sin^2\theta}}{r}. \quad (1)$$

Using the law of reflection, we have
$\alpha = 2\beta - \theta - \pi/2$.
Thus, $$\theta_v = \pi/2 - \alpha = \pi - 2\beta + \theta, \text{ and} \quad (2)$$

$$d_v = d - r\sin\beta - \frac{r\cos\beta}{\tan(2\beta - \theta)}. \quad (3)$$

For a given angle θ, the angle β can be obtained using Eqn. (1), following which the viewpoint $d_v$ and the angle $\theta_v$ of cone the can be obtained using Eqns. (3) and (2) respectively. Note that viewpoint near to the mirror surface has a larger cone, and a far viewpoint a smaller cone.

This modeling can be extended to the case of multiple spherical mirrors, because a sphere is rotationally symmetric in all directions. When the image is acquired via multiple spherical mirrors, each mirror results in virtual axial-cone cameras on the line joining the mirror center and the COP of the camera.

Refractive Sphere

The above axial-cone modeling applies equally well to the refractive sphere with a different set of virtual viewpoints and associated cone angles. We assume the refractive sphere to be of constant refractive index μ, and ignore specular and internal reflections from its surface and inside. Due to symmetry, rays at an angle θ from the camera intersects on the axis joining the COP of the camera and the sphere center. Thus, similar to a reflective sphere, the cone of rays at an angle θ can be modeled as cone of rays at $d_v$ corresponding to the angle $\theta_v$, where $d_v = d(1 + \sin\theta/\sin\theta_v)$, and $\theta_v = 2\arcsin(d\sin\theta/r) - 2\arcsin(d\sin\theta/(r\mu)) - \theta. \quad (4)$ Note that the real and virtual viewpoints are on the opposite sides of the sphere.

Refocusing Using Sphere Array

Now, we use our axial-cone modeling for digital refocusing of a single image of a scene acquired via the array of spheres, which applies to both reflective and refractive spheres. Refocusing can be performed by projecting the acquired rays to the desired scene geometry, referred to as refocusing geometry.

Typically, a planar geometry is used and the refocusing effects are produced by changing the depth of the plane. However, a planar geometry is not the only choice for wide-angle lightfields. We can use a variety of geometries such as spherical geometry and surfaces based on object depth.

Refocusing Implementation

Figure 4:
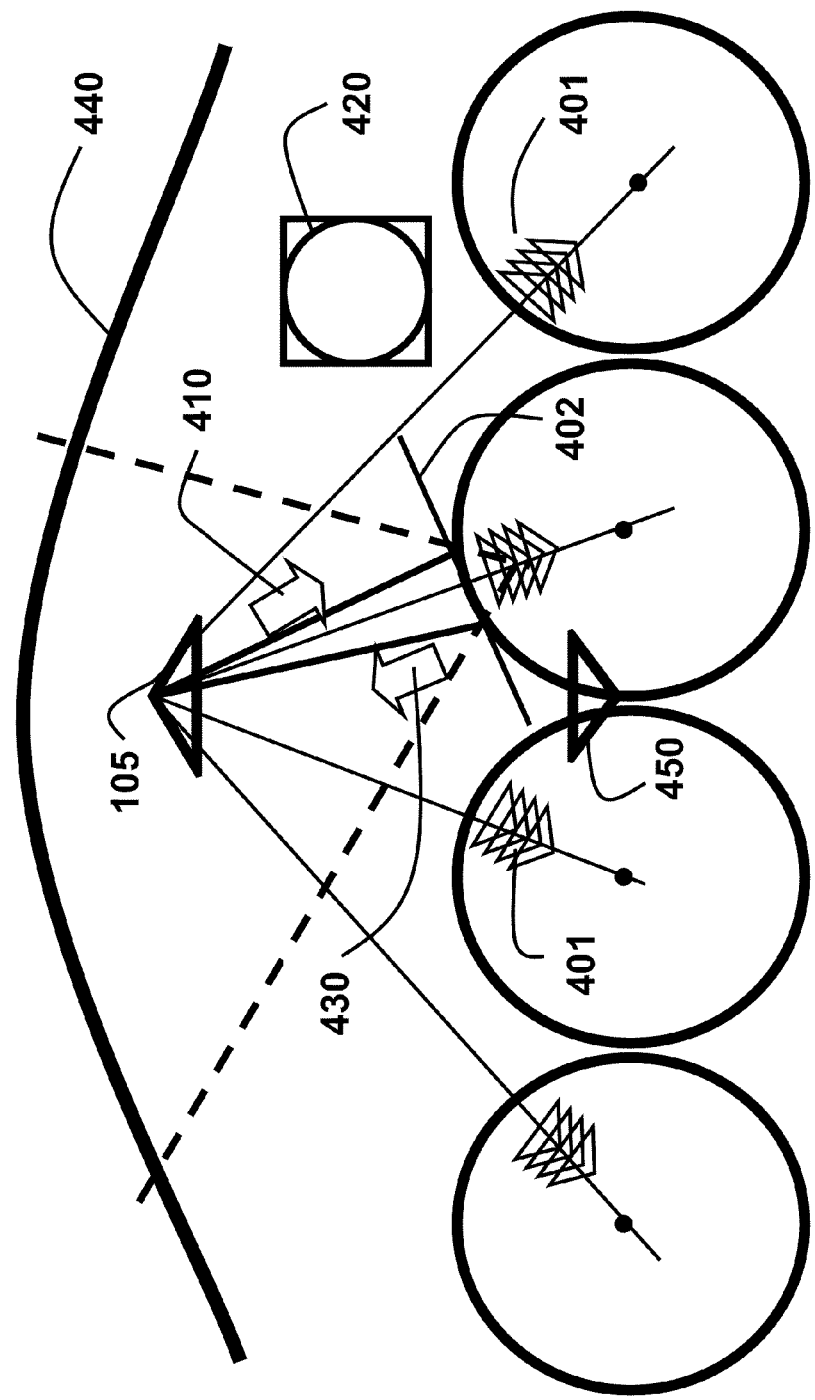
FIG. 4 is a flow diagram of a method refocusing a wide-angle image acquired by a single camera according to embodiments of the invention.

FIG. 4 shows the method for refocusing a reflective sphere array according to embodiments of the invention. The figure shows one row of the array. It is understood that this equally applies to all rows. The single input image 109 of the scene 100 as observed in the array of spheres is acquired by the single real camera 105. The pixels corresponding to each sphere in the input image are referred to as a sphere image.

For each virtual camera 401, we define a virtual image plane 402 passing through points of the sphere, wherein the points are reflection points. Then, we perform projective texture mapping 410 of each sphere image to all the virtual cameras on the virtual image planes to produce corresponding virtual images to account for the homography between the acquired image and the virtual images. For a refractive sphere array, the virtual image plane is defined at the intersections of incoming rays from the real camera to the sphere and outgoing rays from the sphere to each virtual camera.

For each virtual camera, we identify a circle of pixels 420, which corresponds to a cone of rays associated with the virtual camera. In practice, we uniformly sample the virtual viewpoint range using the N virtual cameras. Let $\theta_v$ denote the cone-angle of the $i^{th}$ virtual camera. Then, each virtual camera has a circular region of pixels corresponding to the cone-angles in a range $$\left[\frac{\theta_v(i) + \theta_v(i-1)}{2}, \frac{\theta_v(i+1) + \theta_v(i)}{2}\right].$$

Extra pixels outside of the range are removed by the GPU fragment shader.

Then, each virtual camera image is projected 430 to a refocusing geometry 440 by assuming a refocus viewpoint 450. Note that the scene geometry 440 need not be planar because the projective texture mapping 430 can correctly handle the projections from the virtual cameras.

The projection of all virtual cameras for a single sphere results in a wide-angle lightfield 'view.' Unlike a conventional lightfield, each lighfield 'view' does not have a single viewpoint. The wide-angle lightfield views are then averaged to produce the output refocused image 108. Because all straight lines in the scene are mapped to straight lines in the views, we can average the views to obtain a wide-angle perspective refocused image.

The GPU implementation only requires back-projection (project image pixels to a scene geometry), because interpolation between pixels is automatically performed by the texture mapping of the GPU. In addition, we process a cone of rays, instead of a single ray, in a single rendering path. This is much faster than forward projection of scene points, which is performed ray-by-ray and each projection requires solving higher order equations for reflections and refractions. Our GPU implementation is 10,000 (four orders of magnitude) faster than ray-tracing.

For a narrow FOV, a single perspective output refocused image is sufficient. For wide-FOV, the single rendering does not sample sufficient light rays across wide angles. Therefore, we generate a cube map at the refocus viewpoint by using five virtual perspective cameras, each having different directions and 90° FOV. The cube map can be transformed to a spherical map on which global projections, such as Mercator and stereographic projections, can be applied.

Dense Depth Estimation and Applications

Similar to plane sweeping, we generate lightfield views projected on spherical scene geometry at multiple radii. We use the variance across all of the views as a color consistency measure, and estimate a depth map using a graph-cut framework. Another method to estimate a depth map is to generate a focal stack, i.e., a series of images focused at different depths, by averaging the views at each radius and to use the sharpness of the images as the consistency measure. Using the estimated depths, the refocused images can be combined to obtain an all-in-focus image.

Aliasing Removal

Because of sparse spatial sampling, large depth variations in wide-angle scenes can cause aliasing artifacts in the refocused images. This is similar to aliasing artifacts in lightfields acquired using conventional camera arrays due to sparse spatial sampling. Techniques, such as aperture filtering, require the time-consuming forward projection of scene points.

Instead, we simply apply a geometrically accurate depth dependent blur on refocused images. We use a spatially varying Gaussian filter with a standard deviation $$\sigma = \alpha |d_p|,$$

where $d_p$ is the disparity difference between the refocusing geometry and the pixel depth, and $\alpha$ controls the amount of blur.

Surface Dependent Refocusing

In scenes containing multiple objects at different depths, all foreground objects cannot be concurrently brought into focus using a common spherical or planar refocusing geometry. We achieve this goal by using a modified depth map as the refocusing geometry. We keep the depth values corresponding to the foreground objects unmodified, and replace the background depth value with the nearest foreground depth value.

Wide Angle Projections

To obtain visually pleasing images, several global projections are known, each preserving some property but invariably leading to distortions. Some known methods use local constraints. For well-structured indoor scenes with few foreground objects, a multi-plane projection works well.

We provide a new content preserving projection by enforcing local perspective constraints within a chosen narrow FOV. In conventional wide-angle projection methods, the goal was to maintain fidelity over the entire image because the images have a large DOF. On the other hand, our output images show depth-of-field effects and user's attention is drawn towards in-focus regions. A user might want to locally minimize distortions on in-focus objects, while distortions on out-of-focus regions could be acceptable.

Parameterization and Optimization

Our parameterization and optimization is as follows. The image projection is viewed as a mapping from the viewing sphere $(G(\lambda, \phi))$ onto the planar image domain $u=(u, v)$. The rendered image I is given by $$I(x,y)=G(u(x,y),v(x,y)).$$

The unknowns of the mapping are u and v. The conformality of the mapping is enforced by discretizing the Cauchy-Riemann equations $$\cos \phi_{i,j}(u_{i,j+1}-u_{i,j})=-(v_{i+1,j}-v_{i,j})$$

$$\cos \phi_{i,j}(v_{i,j+1}-v_{i,j})=-(u_{i+1,j}-u_{i,j}).$$

Smoothness is enforced by minimizing the curvature of the mapping as $$\begin{bmatrix} \frac{\partial^2 u}{\partial \phi \partial \lambda} & \frac{\partial^2 u}{\partial \phi^2} \\ \frac{\partial^2 v}{\partial \phi \partial \lambda} & \frac{\partial^2 v}{\partial \phi^2} \end{bmatrix} = \begin{bmatrix} 0 & 0 \\ 0 & 0 \end{bmatrix}.$$

To enforce local perspective constraints, a bounding box in the $\lambda$, $\phi$ space is selected. The center of the bounding box is given by $\lambda_0$, $\phi_0$. This region is projected to the plane tangential to the viewing sphere at $\lambda_0$, $\phi_0$, resulting in a perspective projection with an optical axis that is the line joining $\lambda_0$, $\phi_0$ to the center of the viewing sphere.

Each pixel P on this locally perspective image corresponds to a particular $(\lambda_{i,j}^P, \phi_{i,j}^P)$. Then, we minimize the difference between neighboring vertices in the projection map for the selected region.

$$u_{i+1,j}-u_{i,j}=\lambda_{i+1,j}^P-\lambda_{i,j}^P, u_{i,j+1}-u_{i,j}=\lambda_{i,j+1}^P-\lambda_{i,j}^P$$

$$v_{i+1,j}-v_{i,j}=\phi_{i+1,j}^P-\phi_{i,j}^P, v_{i,j+1}-u_{i,j}=\phi_{i,j+1}^P-\phi_{i,j}^P.$$

Each of the conformal, smoothing and perspective constraint lead to a linear equation in the unknown variables (u, v), which are stacked together to from a linear system Ax=b.

We regularize these equations by adding a regularization term for each vertex that prefers a certain global mapping, e.g., Mercator or stereographic, and select relative weights of constraints to be 1, 12 and 20 for conformal, smoothing and perspective constraints respectively.

Utilizing Dense Depth Map

Perspective constraints try to keep both foreground and background undistorted within a narrow FOV. This works well while refocusing on background, if the foreground objects are small. However, when refocusing on foreground, the constraints might lead to distortions in the background around the edges of the selected regions. We use extracted depth values to automatically constrain the set of pixels on which the perspective constraints are applied.

We detect background regions using a simple depth map thresholding and reduce the weights of the background regions within the user-selected region, leading to a better result.

Spherical Mirror Analysis

Mirror Calibration

Internal camera calibration is performed offline using checkerboard images. Because the physical sphere radius is known, we only need to determine the centers of the spheres with respect to the camera for external calibration. A small number of points, e.g., three, are marked on the boundary of the sphere in the image. We determine the rays corresponding to these marked pixels. These rays are tangential to the sphere in 3D. The sphere center is on the central ray, which makes the same angle $\alpha$ with all the tangent rays. To find this ray, we fit a plane to points on the tangent rays, equidistant from the camera. The normal to this plane passing through the camera gives the central ray. Then, the sphere center is at a distance of $$\frac{r}{\sin a}$$

along the central ray. Note that this calibration is in-image, not requiring extra calibration images or scene features to be visible. It is to be understood that automatic calibration methods using feature points and non-linear optimization can also be applied.

Mirror Size and Baseline

For the $k^{th}$ sphere center at $[x_k, y_k, z_k]$ in the camera coordinate system, let $d_k=\sqrt{x_k^2+y_k^2+z_k^2}$ be the distance between the sphere center and the COP of the camera, and $d_v(j)$ be the distance of $j^{th}$ virtual camera along the axis. Then the location of virtual cameras are given by $$\frac{d_v(j)}{d_k}[x_k, y_k, z_k] \forall k, j.$$

The baseline between virtual cameras for same $d_v(j)$ is given by $$b_{k_1,k_2}(j) = d_v(j) \left\| \frac{[x_{k_1}, y_{k_1}, z_{k_1}]}{d_{k_1}} - \frac{[x_{k_2}, y_{k_2}, z_{k_2}]}{d_{k_2}} \right\|.$$

For each sphere, we place the farthest virtual camera at the cusp of its caustic given by $d_v = (2d_k^2 - 2rd_k)/(2d_k - r)$. The caustic is the envelope of light rays reflected or refracted by the curved surface. For $r = 0.5''$ and $z_k = 850$ mm (constant), the baseline between the farthest virtual cameras for neighboring spheres varies from 25.2 mm to 35.3 mm.

Resolution

We analyze the resolution characteristic for a spherical mirror. Let z be the distance of a scene plane from the camera, and u be the image plane-lens distance. Then, a circle of pixels of radius $\rho_s = (d_v - z) \tan \theta_v$ is projected to a circle of radius $\rho_s = (d_v - z) \tan \theta_v$ on the scene plane. Thus, the tangential resolution can be obtained as $$\rho_i/\rho_s = u \tan \theta / ((d_v - z) \tan \theta_v).$$

Mirror Defocus

For a finite aperture, a catadioptric system cannot achieve perfect focus for all scene points. The prior art has analyzed defocus blur properties for hyperboloid, ellipsoid and paraboloid mirrors with an on-axis camera. We extend the analysis to spherical mirror array.

The camera should be focused inside the mirror, because the entire scene depth range is compressed within the caustic volume. The defocus blur is determined by projecting rays from the scene point to each point on the lens.

Mirror Placement

Figures 5A, 5B, 5C:
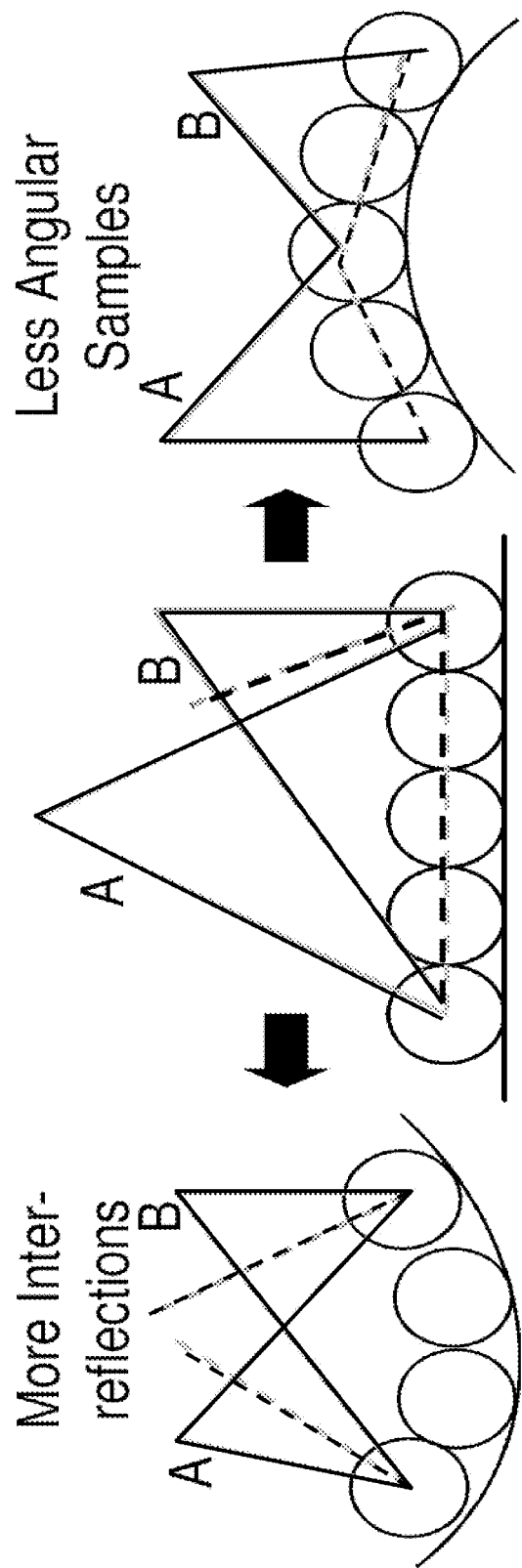
FIGS. 5A-5C show alternative arrangement of spheres on convex, planar and concave surfaces.

Note that axial-cone modeling is applicable to any configuration of mirror spheres. FIGS. 5A-5C shows three configurations, where spheres are placed on a concave, flat, and convex surfaces. The placement of mirrors alters inter-reflections A, and occlusions B, thereby affecting baseline and number of angular samples. By occlusions, we mean that each scene point may not be visible in every mirror, due to occlusion from some other mirror.

The curved surface provides a more uniform baseline across the FOV compared to flat surface. However, the concave surface increases mirror inter-reflections and reduces the number of angular samples (effective synthetic aperture). Curved surfaces also require a greater camera DOF for acquiring the image.

Refractive Sphere

Let us compare the spherical mirror and refractive sphere for the same radius $r = 0.5''$, i.e., less than one inch, and distance d from the camera. For both cases, the extremum angle θ is given by $\arcsin(r/d)$, when the ray becomes tangent to the sphere. Substituting in Eqns. (2) and (4), the maximum achievable FOV is $$\left(\pi - \arcsin\frac{r}{d} - 2\arcsin\frac{1}{\mu}\right)$$

for spherical mirror, and $$\left(\pi - \arcsin\frac{r}{d}\right)$$

for refractive sphere. Thus, a spherical mirror always provides a larger FOV than a refractive sphere. Note that the virtual viewpoints span a larger range (larger caustic) for refractive sphere than for spherical mirror. Thus, it would require more number of virtual cameras for modeling.

Resolution and Defocus

Using our axial-cone modeling, the resolution characteristics of a refractive sphere can be determined. As for the reflective case, the tangential resolution for a scene plane at distance z is given by $$\rho_i/\rho_s = u \tan \theta / ((z - d_v) \tan \theta_v).$$

Reflective and Refractive Sphere Distinguished

For both cases, the resolution decreases as the FOV increases. A refractive sphere provides better resolution (large image size of an object) than a reflective sphere, due to smaller achievable FOV. However, similar to a mirror, a refractive sphere cannot perfectly focus a scene point onto the image plane for a finite aperture size. A refractive sphere acts as a lens and results in larger defocus blur compared to a reflective sphere.

EFFECT OF THE OF THE INVENTION

We believe that reflective and refractive spheres offer a promising new avenue for computational methods to enhance digital imaging. While we have focused on depth of field effects and dense 3D reconstruction, axial-cone modeling can also be useful for other applications such as wide-angle sparse 3D reconstruction using multi-view stereo, rendering rain, and deblurring of spherical mirror and lens blur.

To generate DOF effects in wide-angle images, a wide FOV lightfield is acquired. We describe design aspects for achieving a practical system, and analyze its properties in detail. We describe axial-cone modeling, applicable to both rotationally symmetric reflective and refractive elements, and utilized its benefits using spherical mirrors and refractive spheres. Our modeling avoids explicit ray-tracing and approximations, and leads to a fast implementation for digital refocusing.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for obtaining a refocused wide-angle image of a scene, comprising:

acquiring, by a single stationary camera, an input image of a scene as observed in an array of spheres, wherein pixels in the input image corresponding to each sphere comprise a sphere image;

defining, for each sphere, a set of virtual cameras on a line joining a center of the sphere and a center of projection of the camera, wherein each virtual camera has a virtual image plane;

projecting, for each virtual camera of each sphere, the sphere image to the virtual image plane;

selecting, for each virtual camera of each sphere, a set of pixels corresponding to a cone of rays associated with the virtual camera to produce a virtual camera image, wherein the set of pixels forms a circle in the virtual image plane;

projecting, for each sphere, all of the virtual camera images to a refocusing geometry assuming a refocus viewpoint to produce a view, wherein the view represents a wide-angle lightfield view and wherein the views are generated for the refocusing geometry placed at multiple depths to estimate a wide field-of-view (FOV) depth map by evaluating a variance across the wide-angle views at each pixel;

averaging the views for all the spheres to produce the refocused wide-angle image; and displaying the refocused wide-angle image on an output device.

2. The method of claim 1, wherein the projecting of the sphere images and the virtual camera images is performed by using projective texture mapping on a graphic processing unit (GPU).

3. The method of claim 1, wherein the projecting of all of the virtual camera images is performed for the refocusing geometry placed at multiple depths to generate a focal stack.

4. The method of claim 3, wherein the wide FOV depth map is estimated by evaluating a sharpness measure of the refocused images in the focal stack at each pixel.

5. The method of claim 1, wherein the wide FOV depth map is estimated by evaluating a consistency measure across all the views at each pixel.

6. The method of claim 1, wherein the wide FOV depth map is used as the refocusing geometry to obtain an all-in-focus output image.

7. The method of claim 1, wherein the refocusing geometry is modified according to the wide FOV depth map to bring multiple depths into focus simultaneously.

8. The method of claim 1, further comprising: specifying the refocusing geometry and the refocus viewpoint by the user.

9. The method of claim 8, wherein the specifying is interactive.

10. The method of claim 1, wherein each sphere image is modeled as multiple axial-cone cameras, wherein each axial-cone camera has a different virtual viewpoint and an associated cone of rays.

11. The method of claim 1, wherein the camera is a video camera to acquire multiple input images of the array of spheres.

12. The method of claim 11, wherein each input image is processed independently.

13. The method of claim 1, wherein the array is regular.

14. The method of claim 1, wherein the array is irregular.

15. The method of claim 1, wherein the array is random.

16. The method of claim 1, wherein the array is two-dimensional.

17. The method of claim 1, wherein the array is three-dimensional space.

18. The method of claim 1, wherein a number of spheres is greater than one.

19. The method of claim 1, wherein the spheres are reflective.

20. The method of claim 1, wherein the spheres are refractive.

21. An apparatus for obtaining a refocused wide-angle image of a scene, comprising:

an array of spheres;

a single camera configured to acquire an input image of a scene as observed in the array of spheres, wherein pixels in the input image corresponding to each sphere comprise a sphere image;

means for defining, for each sphere, a set of virtual cameras on a line joining a center of the sphere and a center of projection of the camera, wherein each virtual camera has a virtual image plane;

means for projecting, for each virtual camera of each sphere, the sphere image to the virtual image plane;

means for selecting, for each virtual camera of each sphere, a set of pixels corresponding to a cone of rays associated with the virtual camera to produce a virtual camera image, wherein the set of pixels forms a circle in the virtual image plane;

means for projecting, for each sphere, all of the virtual camera images to a refocusing geometry assuming a refocus viewpoint to produce a view, wherein the view represents a wide-angle lightfield view and wherein the views are generated for the refocusing geometry placed at multiple depths to estimate a wide field-of-view (FOV) depth map by evaluating a variance across the wide-angle views at each pixel;

means for averaging the views for all the spheres to produce the refocused wide-angle image; and an output device configured to display the refocused wide-angle image.

22. The apparatus of claim 21, wherein the spheres are reflective.

23. The apparatus of claim 21, wherein the spheres are refractive.

24. The apparatus of claim 21, wherein the means for projecting is a graphic processing unit.

* * * * *